J. POWELL.

Globe-Valve.

No. 6,528.

Reissued July 6, 1875.

James Powell
By Knight Bros Att'ys.

Attest.
Jas. H. Layman
Walter Knight

N. PETERS, PHOTO-LITHOGRAPHER, WASHINGTON, D. C.

UNITED STATES PATENT OFFICE.

JAMES POWELL, OF CINCINNATI, OHIO.

IMPROVEMENT IN GLOBE-VALVES.

Specification forming part of Letters Patent No. 61,758, dated February 5, 1867; reissue No. 6,528, dated July 6, 1875; application filed May 25, 1875.

*To all whom it may concern:*

Be it known that I, JAMES POWELL, of Cincinnati, Hamilton county, Ohio, have invented a new and useful Improvement in Globe-Valves, of which the following is a full, clear, and exact specification, reference being had to the accompanying drawing forming a part thereof.

My invention relates to that class of cocks known as "globe-valves;" and my invention consists, first, in combining the elements of a screw-stem guided to an axial position relatively to the valve-seat with an ordinary loose disk or flexibly-attached valve, such valves heretofore having never been adapted to preserve a central position upon their seats other than what could be afforded by the opposing surfaces of the beveled portions. Second, my invention further consists in the provision of a locking device, whereby such valve-disk, when worn unequally, can, for the time being, be rigidly united with its stem, for the purpose of being ground or reground to its seat, through the instrumentality of said stem. Third, my invention further consists in the loose valve-disks of guiding devices, which coact with those about the stem, to maintain both valve and stem to a truly axial position in relation to the seat, whether in the loose or in the rigid condition of the valve.

In all globe-valves adapted for regrinding it has been customary hitherto to construct the screw-stem and the valve in one solid piece, and this rigid connection of these parts has, of course, rendered impossible any nice self-adjustment of the valve to its seat, such as is requisite to secure, under all circumstances, a perfectly-tight joint. On the other hand, in the common globe-valve provided with a flexibly-connected disk, no provision is made for the lateral wear of the screw-stem and of the nut which it traverses; consequently the valve-disk is liable to be thrown out of line in closing upon its seat, so as to cause leakage; but in my improved valve any lateral play of the screw-stem within its nut is prevented, through the instrumentality of the body-neck, which maintains said stem in an axial position at all times.

In the common globe-valve just alluded to, in which a flexibly-attached valve has been used, no provision has ever been made for the regrinding of such valve by means of its screw-stem and handle. On the contrary, when such valves have had to be reground, it has heretofore been customary to unscrew the disk from the stem, and, by inserting a wooden plug or handle, to attempt to clumsily grind the disk to a bearing.

Figure 1:
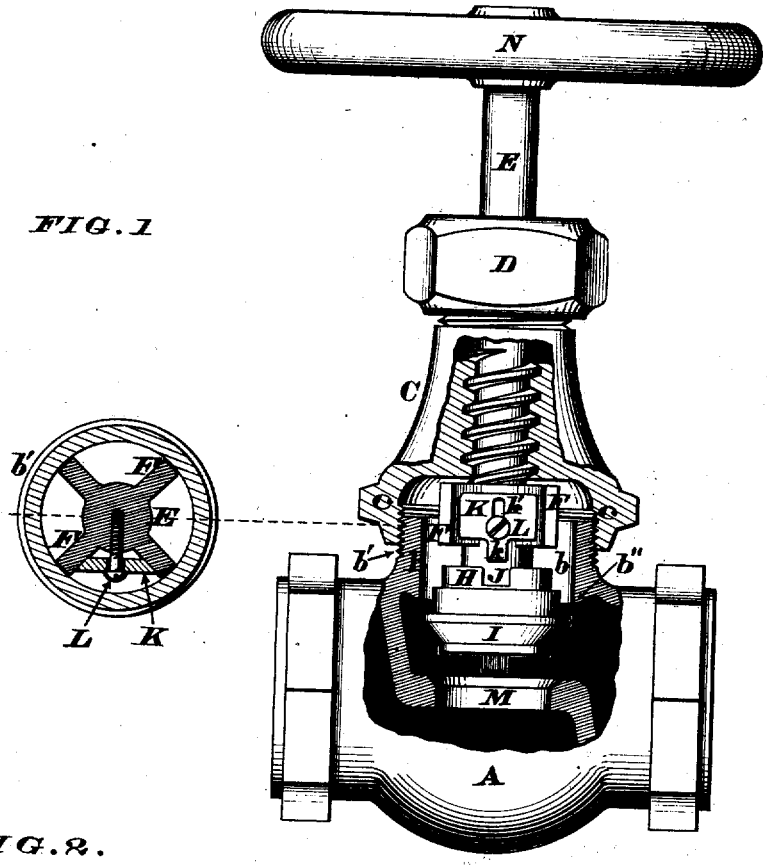
Figure 2:
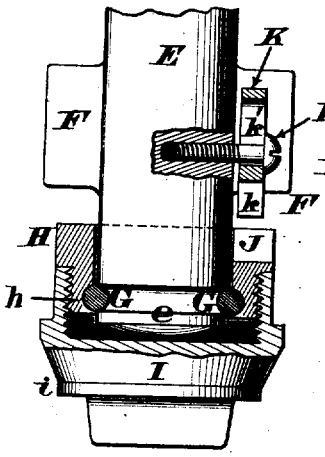
Figure 3:
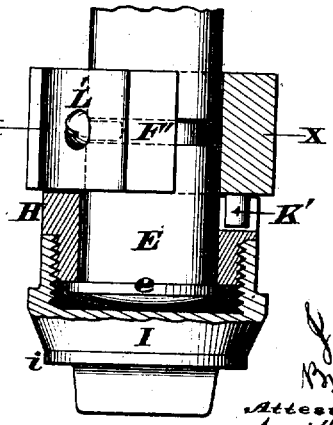
Figure 4:
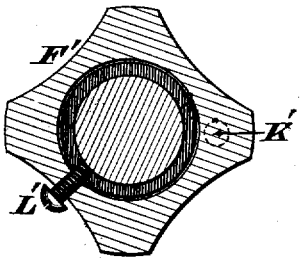

In the accompanying drawing, Figure 1 is an axial section of a globe-valve embodying my improvement. Fig. 2 is an axial section of the valve proper, at right angles to the above. Fig. 3 shows, by side elevation, a modification of my improvement. Fig. 4 is a horizontal section of the same at the line X X.

The body A, Fig. 1, of the cock has a neck, B, having a smooth cylindrical interior, *b*, which extends downward, *b''*, into the body A, to insure greater length of bearing for the wing-guides F. The said neck has a screw-threaded exterior, *b'*, which exterior receives the interiorly screw-threaded hub or screw-nut C *c*, which hub is surmounted by a customary stuffing box, D. The valve-stem E is provided with guide wings or bearings, F, adapted to fit and slide within the cylindrical interior of the neck, as described in the patent granted to me on the 2d day of May, 1865. The lower end of stem E is so constructed that a shoulder or enlargement is formed by means of a ring, G, sprung into an encircling groove, *e*, near the lower end of the stem, which ring engages with the interior shoulder *h* of the plug H, and prevents the plug from slipping off of the stem. The plug H is screwed into the recessed and screw-threaded back of the valve proper, or disk I, just so far as, while permitting free vibration of the disk with reference to the stem and unobstructed rotation of the latter, to at the same time preserve the disk from undue looseness or lateral play.

The under side of the plug H is chambered out to sufficient capacity to inclose the collar G. The stem terminates in a swell, *e*, which, when the screw-stem is depressed, bears solidly upon the upper side or back of the disk. The plug H has a notch or cavity, J, which, when it is desired to so unite the stem and valve as that they shall revolve together, receives the tongue *k* of the lock-piece K, which piece has a slot, *k'*, to receive a set-screw, L, by which the piece K is secured either in or out of lock with the valve. The lock-piece K tapers downward, and is of such width as just to fill the space between two of the guide-wings, in order to compel simultaneous and equal rotation of the stem and the disk while in the locked condition. When it is desired to grind the valve to its seat the hub or nut C is unscrewed, as in the globe-valve described in my patent of May 2, 1865, and the valve is momentarily withdrawn. The set-screw L being then loosened, so as to allow the tongue *k* of the lock-piece K to drop into the cavity J of the valve, the said screw is again tightened. Sand, powdered glass, or other suitable abradant being then applied, the stem, with its now rigid valve, is restored to its place, and is rotated alternately to the right and left with a downward pressure, the hub C meanwhile remaining loose.

The grinding having been accomplished, the valve and stem are withdrawn once more, and the lock-piece K restored to its upper or inactive position; the stem, with its now loose disk, is then returned to its place in the body, and, finally, the hub C being screwed home again, the valve is again ready for use.

I do not, however, confine myself to the precise arrangement here selected for illustration, as a lock-piece substantially as above may be employed in various ways; for example, the guide-wings may form part of a loose collar, F′, (see Figs. 3 and 4,) which collar may have a tongue, K′, that permanently occupies a suitable cavity in the valve. In this form the locking and unlocking are accomplished by simply tightening and loosening of the set-screw L, the points of said set-screw entering a circumferential groove in the stem, serving, in this form, the twofold purpose of tightening, as above, and (being slackened) of holding the collar F to its place when out of lock.

The valve I has a downward prolongation or extension, *i*, below its beveled portion, which prolongation, snugly fitting the straight walls of the cylindrical passage M, serves the purpose of more effectually guiding the valve I in the act of grinding than if dependence were had on the wings F alone, and is intended to perform the same office as that of the wings shown on the sole of the valve in my patent of May 2, 1865.

I am aware that it is common to construct globe-valves having a loose disk; but I know of no instance in which a loose disk-valve has ever been constructed with provision for rigid attachment to a guided valve-stem, so as to be carried around with the latter in the act of grinding. I am also aware that loose disk-valves have been constructed with an axial guide extending below the seat; but in no instance has this been combined with such a valve having a screw-stem adapted to be guided at its upper end. I am also aware that globe-valves have been constructed whose screw-stems have been adapted to be guided above the valve proper, for the purpose of grinding; but this has only been the case with cocks employing the customary stiff stem, made in one piece with the valve-disk.

I claim herein and of my invention—

1. In combination with a screw-stem adapted to maintain an axial position in the neck of a globe-cock, a loose disk-valve constructed substantially as set forth, so as to be capable of being locked for the purpose of grinding.

2. In the described combination with a valve-stem adapted to maintain an axial position independently of its screw, and provided with a self-adjusting valve, the locking-piece K, or its equivalent, adapted to operate as set forth.

3. In the described combination, the following elements, to wit: a valve-stem having guides for preserving its axial position when released from the screw-cap; a self-adjusting valve, and the tongued and adjustable piece K, adapted to enter the cavity J in the valve, and to be secured either in or out of lock, substantially as and for the purpose set forth.

4. In combination with a screw-stem, adapted to maintain an axial position in the neck of a globe-cock, a loose disk-valve so constructed as to be guided at its lower end, substantially as and for the purposes designated.

5. The described downward prolongation *b″* of the interior wall of the neck B, in combination with a screw-stem adapted to be guided within the same, as and for the purpose explained.

6. The spring-collar G, in combination with screw-stem E, valve I, and plug H, for the purpose described.

7. The combination, in a globe-cock, of a lockable loose valve, I, valve-seat M, screw-stem E, and handle N, for the purpose set forth.

In testimony of which invention I hereunto set my hand.

JAMES POWELL.

Attest:

GEO. H. KNIGHT,
HARRY E. KNIGHT.